Oct. 16, 1956      P. R. VAN SITTERT      2,766,631
POWER MULTIPLYING MECHANISM FOR PORTABLE HAND TOOLS
Filed June 9, 1950      2 Sheets-Sheet 2

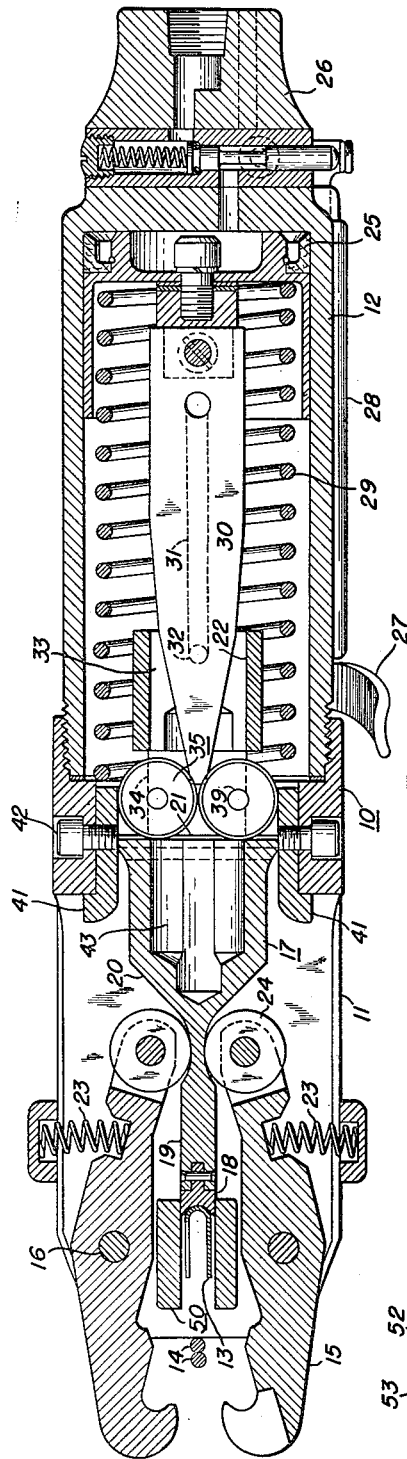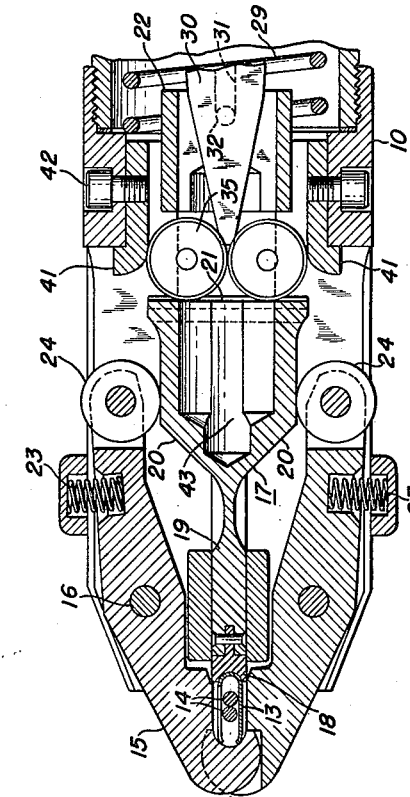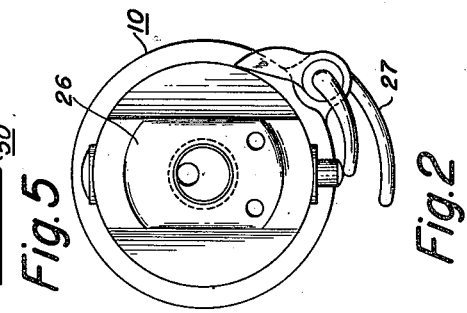

INVENTOR.
PAUL R. VAN SITTERT.
BY Woodling and Kroet
atty

United States Patent Office 2,766,631
Patented Oct. 16, 1956

2,766,631

POWER MULTIPLYING MECHANISM FOR PORTABLE HAND TOOLS

Paul R. Van Sittert, Shaker Heights, Ohio, assignor to The Rotor Tool Company, a corporation of Ohio Application June 9, 1950, Serial No. 167,030

6 Claims. (Cl. 74—110)

This invention relates to fluid-operated tools in general, but relates more specifically to a fluid-operated ram tool wherein the force of a longitudinally reciprocable fluid-driven piston is transposed to a longitudinally reciprocable ram at a mechanical force ratio predetermined in accordance with the longitudinal position of the ram, and with either a regular or irregular rate of change of the force ratio.

An object of this invention is to move a work ram through a rapid advance movement for a predetermined distance, and thereafter move the ram ahead at a slower rate and greater force.

Another object of this invention is to move the ram by the full force of a fluid-driven piston at a high speed ratio for a portion of a work cycle, and thereafter transpose the high speed longitudinal movement of the fluid-driven piston to a reduced speed with greater force.

Still another object of this invention is to interpose separable force transfer members between axially aligned driving and driven members, and confine the separable members to predetermined paths of separation, thereby controlling the force and speed transfer ratio between the said members.

Other objects and a fuller understanding of the invention may be had by referring to the following description and claims, taken in conjunction with the accompanying drawings, in which:

Figure 1 is a longitudinal section through one embodiment of the invention, with all parts in a retracted position, as at the start of a work cycle;

Figure 2 is an end view from the rear, or air inlet end, of the tool of Figure 1;

Figure 3 is a longitudinal section through a broken-away front portion of the tool, with the wedge and force transfer means advanced through the rapid travel portion of the work cycle provided by this particular illustrated embodiment of the invention;

Figure 4 is a top plan view of a cage member used to hold a clip temporarily in position prior to being engaged by the squeezing mechanism, and also to guide the squeezing mechanism;

Figure 5 is a side view of the cage of Figure 4;

The illustrated embodiment of this invention provides two longitudinal members, one the driven, the other the driver. The members are not directly connected, but are provided with a force transfer means which will translate the force either in direct one-to-one power and speed ratio, or with a reduced speed and increased mechanical advantage, according to the predetermined design of the force transfer means. Furthermore, the force transfer means can be designed, as it is in the illustrated embodiment, to provide one-to-one ratio over part of a work cycle, and provide a mechanical advantage during another. Therefore, the high speed and relatively small force of the driving member may at some portions of the work cycle be translated unaltered, and at other portions of the work cycle the speed may be translated into force greater than could be furnished by the direct prime source of thrust available.

Figure 10:
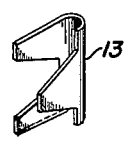
Figure 10 is a perspective view of a clip.
Figure 11:
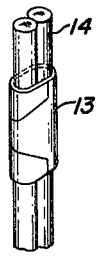
Figure 11 is a perspective view of two wires, such as spring parts, joined by a clip fastened by the device illustrated herein.

Specifically, to illustrate one embodiment of the invention, the principles thereof have been incorporated into a clip squeezer for wrapping a metal band about two mating wires. This type of work is often done in assembling a complete spring, as, for example, an automobile seat construction. A clip 13 is illustrated in Figure 10 of the drawings as it appears when stamped and preliminarily bent prior to being finally applied by the clip squeezer of this invention. In Figure 11 the clip 13 is illustrated applied to hold two wires 14 firmly bound together.

In Figure 1 of the drawings a practical embodiment of the invention, as incorporated into a clip squeezer 10, consists of a longitudinal housing of two parts: a cylinder portion 12, containing a tapered driving wedge 30 powered by a driving piston 25; and a nose portion 11, containing a work ram assembly 17. The driving wedge 30 and the work ram assembly 17 are joined together to transfer driving force from the piston 25 to the work ram assembly 17.

At the end of the nose portion 11, jaw fingers 15 are pivotally mounted by pivot pins 16. Springs 23 are provided to hold the jaws in a normally open position. The jaw fingers, when closed, form an anvil against which the open ends of the clips 13 are forced to fold the open ends thereof around the mating wires 14.

The work ram assembly 17 has a replaceable tip 18 thereon which is removably secured and may therefore be replaced when worn. A body portion 19 of the assembly 17 extends from the tip 18 to a rear portion having cam shoulders 20. Each jaw finger 15 carries a roller 24 thereon. The rollers 24 ride on cam shoulders 20, as the body portion 19 moves forward, to force fingers 15 to pivot and close against the urge of springs 23, as illustrated in Figure 3.

A fluid inlet control head 26 may be connected to a convenient motive fluid line and the fluid introduced behind the piston 25 by any convenient control means. In the illustrated embodiment a trigger 27 has been positioned partially down the side of the housing 12, and connects to the actual control head 26 to a torque rod 28. Therefore, the operator of this embodiment of the invention may hold the clip squeezer balanced in his hand and very conveniently press the trigger 27 without need to move his hand. A spring 29 is provided as a convenient means to return the piston 25 to the starting position illustrated in Figure 1 when the fluid pressure is released. The driving wedge 30 is secured to the piston 25, and accordingly return movement of the piston 25 will also draw the driving wedge 30 to the starting position illustrated in Figure 1.

In using the illustrated embodiment of the invention as incorporated into a clip squeezer, the clip squeezer and the members to be joined are moved into a relative position with the members to be joined between the open jaw fingers 15, substantially as shown in Figure 1 of the drawing. Thereafter, the trigger 27 is actuated to initiate movement of the driving wedge 30 forward. By a coupling means, the work ram assembly 17 is in turn driven forward. In the actual tool, a cage holder 50 is placed in the line of movement of the work ram assembly 17, rearwardly of the position of the members to be joined. The cage holder 50 is provided for two purposes, namely, (1) to hold the clip 13 temporarily in proper position to be pushed forward around the wire members 14 against the hook ends of the jaw fingers 15, and (2) to serve as a guide for the body portion 19 of the work ram assembly 17. The cage 50 has a table top portion 51 with two parallel bar legs 52. An opening 53 through the table top 51 extends down between the bar legs 52. The Figure 1 of the drawings, being a sectional view through the entire clip squeezer device, is also a section through the two bar legs 52 of the cage 50. The Figure 1 illustrates the relative position of the clip 13 within the cage 50 between the two bar legs 52, and also illustrates the position of the tip of the body portion 19 between the two bar legs 52. The bar legs 52 sit down against the outside surface cover plate of the nose portion 11, and when the clip 13 is placed through the opening 53 it will contact the cover plate and stay within the area between the two bar legs 52.

Forward movement of the work ram assembly 17, of course, will close the jaw fingers 15 as previously described, and bring the tip 18 into contact with the clip 13 and move it forward into the position substantially as illustrated in Figure 3.

It is at once obvious that a rigid connecting member from the piston 25 to the tip 18 could be provided to perform the function as thus far described to bring the tip 18 rapidly up into contact with the clip to be squeezed. However, in a reasonable size tool, and with the usual fluid pressure available, sufficient pressure cannot be developed by the piston 25 to fold the clip 13 around the wire members 14.

Figure 9:
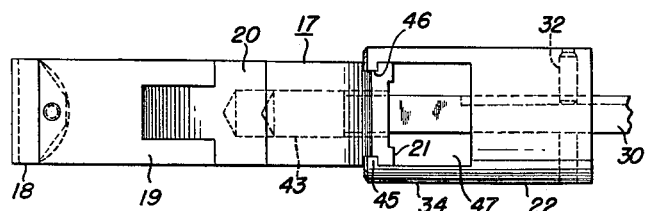
Figure 9 is a side elevation of the work ram assembly removed from the tool, this view being at 90° with respect to the position thereof illustrated in Figures 1, 3 and 6.

According to the embodiment of the invention adapted for the clip squeezer illustrated, a force transfer mechanism relates the work ram assembly 17 and the driving wedge 30 into a composite construction for producing mechanical advantage. In Figure 9 of the drawings the work ram assembly 17 has been illustrated removed from the balance of the mechanism for clear understanding of the construction thereof. Figure 9 is taken at 90° with respect to the Figures 1, 3 and 6.

Figure 7:
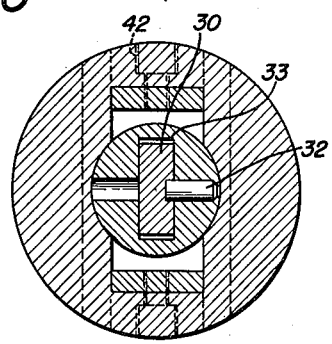
Figure 7 is a sectional view along lines 7—7 of Figure 6.

The work ram assembly 17 is illustrated in Figure 9 separate from the cooperating clip squeezer construction. The work ram assembly 17 comprises generally the driven body 19 and a coupler 22. The coupler 22 acts as a part of the driven member, and serves the purpose, among others, of holding the driving and driven members in telescoping engagement against buckling. The coupler member 22 is provided with a longitudinal slot 33, as best seen in Figure 7. Driving wedge 30 fits loosely into the slot 33, thus permitting relative longitudinal movement while preserving substantial axial alignment with work ram assembly 17. This is what is meant by telescoping engagement. The coupler 22 also provides an inter-connection between the driving and driven members for limiting separational movement of the driving and driven member.

Figure 6:
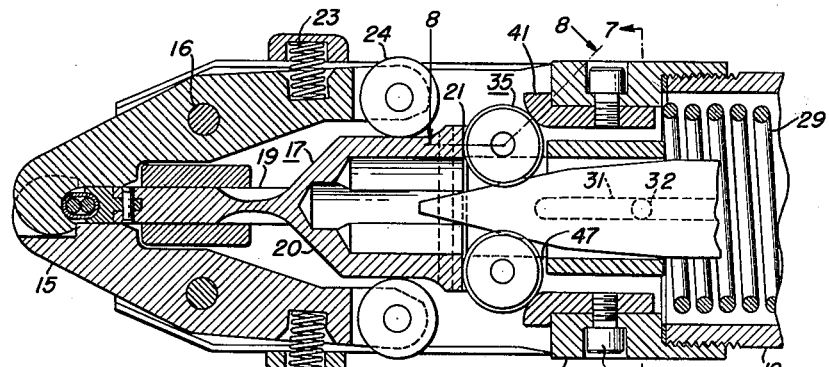
Figure 6 is a view similar to Figure 3 with the wedge ram further advanced, and with the force transfer means transmitting driving force from the high speed piston to the work ram at slower speed and greater force.

As before stated, a force transfer mechanism relates the work ram assembly 17 and the driving wedge 30 into a composite construction for producing mechanical advantage. The force transfer mechanism comprises separable rollable members 35 held to a predetermined path by guide tracks 41. The guide tracks are carried by the nose portion 11, and are not illustrated in Figure 9. The coupler 22 has two side arms 34 ending in inwardly hooked ends 45. The punch body 19 has corresponding recesses 46 to receive the hook ends 45. Accordingly, the coupler 22 and the punch body 19 may be joined by sliding the hook ends 45 laterally into the recesses 46. The side arms 34 are spaced and therefore a lateral opening 47 remains, through which the roller members 35 may enter. Figures 1, 3 and 6 of the drawings illustrate the fact that the opening 47 moves between tracks 41 as the work ram assembly 17 advances. Accordingly, the rollable members 35 are held tight together against lateral separation by the guide tracks 41 when the work ram assembly 17 is retracted as illustrated in Figure 1. The rollable members 35 cannot separate. Therefore, advance movement of the ram 30 will attempt to press the end of the ram 30 between the rollable members 35, but will not cause separation. Only advance movement of the rollable members 35 and the assembly 17 between the guide tracks 41 will result.

The Figure 9 also illustrates the method which has been employed to transfer force from the rollable members 35 to the work ram assembly 17. Pressure-receiving surfaces 21 are provided on the body portion 19 for receiving the thrust from the roller members 35. Figure 9 shows that the surfaces 21 extend laterally of the driven work ram assembly 17, and the roller members 35 therefore roll upon the surfaces 21 when the tapered driving wedge 30 pushes against the rollable member, or cleaves between them.

After the ram 30 has forced the rollable members 35 forward, and consequently the body portion 19 forward, until the rollable members 35 reach the curved portion of the guide tracks 41, the rollable members 35 will begin to separate and the wedge ram 30 will begin to cleave between the rollable members 35. The body member 19 has a recess 43 to permit the end of wedge 30 to telescope into the body member 19.

There are two sets of roller members 35 illustrated interposed between the punch body 19 of the work ram assembly 17 and the end of the driving wedge 30. If it were not for the rollers 35 the driving wedge 30 could advance directly into the opening 43, and therefore overlap longitudinally with respect to the driven work ram assembly 17 without transferring any driving force to the driven work ram. The roller members 35 block entrance into the opening 43 and therefore intercept forward movement of the driving wedge 30 to transfer driving force to the driven work ram assembly 17.

The guide tracks 41 are secured by suitable screw members 42 to the inner sides of the nose portion 11 of the housing. The tracks 41 prevent separational movement of the roller members 35 with respect to one another further than the surface provided by the track members 41. In other words, in the illustrated embodiment the tracks members 41 have parallel flat surface portions, and they also have symmetrically diverging curved surface areas. Therefore, the roller members 35 cannot separate when they are between the parallel surfaces, and accordingly any force placed against the roller members 35 will push the roller members forward at the same speed as the moving force, and the roller members will in turn push the assembly 17 at that same speed. The roller members 35, when held against separation, are force transfer members, not transmission members. Advance movement of the driving wedge 30 will attempt to spread the roller members 35 apart, but can produce only a forward movement. Upon reaching the curved surface areas, however, the roller members can part and permit the tapered driving wedge 30 to pass between the roller members. Once the wedge 30 begins to pass between the roller members 35, then the driving wedge 30 is advanced faster than the driven work ram assembly 17. All moving force for the driven work ram assembly 17 is transmitted from the driving wedge 30 through the moving roller members 35. Therefore, the curved surfaces of the tracks 41 serve as a continuously changing fulcrum point, and the roller members serve to transfer driving force from the wedge 30 to the driven work ram assembly 17 at a reduced speed but large mechanical advantage.

The work ram assembly 17 depends upon forward movement of the driving wedge 30 for a source of motive force. By the same token, a motive force must be provided to return the assembly 17 to the starting position after it has been advanced into the work. The driving wedge 30 is returned by the spring action of spring 29. Because the driving wedge 30 and the work ram assembly 17 are normally extendable and retractible without interconnection except for the force transfer through the roller members 35, there is no force normally tending to return the work ram assembly 17 to the starting position. In Figures 1, 3 and 4, and particularly in Figure 5, a pin 32 is shown extending into the hole 33 of the coupler member 22. A long groove 31 in the side of the driving wedge 30 provides a free fit for the pin 32 through the normal advance movement of the driving wedge 30, but upon retraction of the driving wedge 30 from the forwardmost position of the work cycle, the end of the groove will contact the pin 32 and produce a direct hooking engagement to drag the work ram assembly 17 therealong until the entire construction is dragged back to the rest position illustrated in Figure 1 of the drawings. Note that in Figure 1 of the drawings the pin 32 is engaged in the end of the slot 31, and also in Figure 3 the pin 32 is in the end of the slot 31. With the roller members 35 confined against the lateral movement, resulting in a one-to-one forward ratio between the driving wedge 30 and the punch body 19, no relative movement takes place between the ram assembly 17 and the ram 30, and consequently the pin 32 and the end of the slot 31 remain engaged. The driving wedge 30 commences to advance faster than the work ram assembly 17 once the roller members 35 begin to separate, and consequently movement of the slot 31 relative to the pin 32, as illustrated in Figure 6 of the drawings, does not take place until the roller members 35 reach the lateral diverging surfaces of the track members 41.

Broadly, this invention comprises a driving member powered from any suitable source, such as the piston 25 in the illustrated clip squeezer, and a driven ram. Force is transferred from the driving member to the driven ram either in a one-to-one ratio or a mechanical advantage ratio during any selected portion of a work cycle.

To accomplish this control of force transfer, mechanical advantage means is employed, in which the controlled transverse motion of the mechanical advantage means causes the driven ram to move slower in its forward movement than the forward movement of the driving member.

In the illustrated embodiment the roller members 35 are forced in a sideways direction by the action of the driving wedge 30. Thus the driven ram assembly 17 moves slower than the forward movement of driving wedge 30, but with a force greater than that supplied by driving wedge 30. In the illustrated embodiment the two laterally extending pressure-receiving surfaces 21, as best illustrated in Figure 9 of the drawings, receive the forward pressure of the roller members 35, and accordingly as the roller members 35 attempt to squeeze between the pressure surfaces 21 and the curved portion of the tracks 41, a force is transmitted to the pressure surfaces 21, and consequently to the entire work ram assembly 17. In the illustrated embodiment a portion of the tracks 41 is shaped to hold the roller members against separation in order that a portion of the work cycle might be in a one-to-one ratio. This is accomplished by preventing separation of the mechanical advantage means, namely the roller members 35. The surfaces of the track members 41, however, may be continuously sloping outwardly. On the other hand, they may be formed to flare outwardly for a portion of the length, thereafter followed by parallel portions over a further part of their length, and finally followed by a still further outwardly flared portion, in this manner causing an interrupted mechanical advantage work cycle. It may be seen from this explanation that the pressure surfaces 21 are a convenient method of transferring force from mechanical advantage means of the type illustrated as rollers 35, but other suitable means may be employed with other types of mechanical advantage means.

Figure 8:
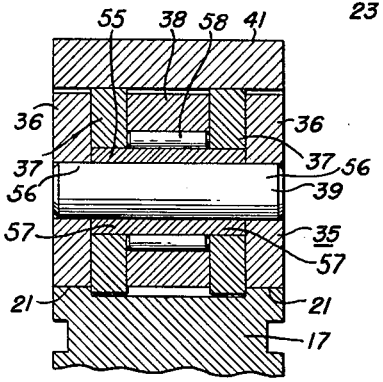
Figure 8 is a section of one roller taken along the angular line 8—8 of Figure 6.

Analysis of the directions in which the roller members would tend to rotate, to produce the rolling wedge movement described, will show that a solid member used for the roller members 35 would have tendencies to rotate in two different directions at once. If the roller members were solid, a sliding movement would be experienced along at least one of the contact surfaces. The roller members have a three-way contact between the driving wedge 30, the tracks 41, and the pressure surfaces 21. In Figure 8 of the drawings a sectional view has been taken along line 8—8 of Figure 6. The line 8—8 is an angular section in order that the contact between the track 41 and the pressure surfaces 21 can be illustrated in one view. Each roller member 35 is a composite member made of five rollers, namely, two companion rollers 36, two companion rollers 37, and a center roller 38. A central axle 39 holds the roller members together as a unit; and the rollers are suitably bushinged and bearinged to provide free and easy rotating movement independent of one another. For the purpose of coaxially mounting the rollers on a common axis, a bushing sleeve 55 is mounted upon the axle 39 to provide the axle with shoulder portions 56 at its ends upon which are mounted the pair of freely rotatable rollers 36. The bushing 55 also provides end or shoulder portions 57 upon which are mounted the freely rotatable rollers 37. The center roller 38 is freely rotatably mounted on roller bearings or needles 58, which in turn are mounted on the central part of the bushing sleeve 55. The intermediate rollers 37 serve to hold the roller bearings 58 in place, while the ends of the bushing serve to hold the rollers 36 spaced apart as shown in Figure 8. The pressure surfaces 21 appear at the bottom of Figure 8 and are illustrated in rolling contact with the outer rollers 36. Accordingly, force from the roller members 35 to the work ram assembly 17 is transferred through the twin rollers 36. The area between the pressure surfaces 21 is recessed considerably, and therefore the twin rollers 37 can be made considerably larger in diameter than the twin rollers 36 and yet produce no contact with the work ram assembly 17. However, the surfaces of the tracks 41 are plane surfaces and accordingly only the twin rollers 37 will contact the surfaces of the tracks 41. Furthermore, Figure 9 illustrates the fact that the driving wedge 30 is a narrow wedge member and accordingly the driving wedge 30 can enter between the two roller members 35, but will contact only the middle rollers 38 of the two roller members 35. In Figure 8 the contact of the driving wedge 30 with the roller 38 does not show. From the illustration in Figure 8, it may be seen that the roller members 35 produce a direct contact between the track surfaces 41 and the pressure surfaces 21, and that the tapered shape of the driving wedge 30 will attempt to drive the roller members laterally between the two track surfaces, thereby producing a wedge effect and transfer driving force from the driving wedge 30 to the driven ram assembly 17.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Ram construction comprising, a driven ram mounted for longitudinal reciprocable movement in a portion of a given path, power actuated tapered driving ram means aligned with said driven ram and mounted for longitudinal movement in a poriton of said given path, separable rollable wedges, guide means confining said rollable wedges to predetermined separation paths diverging laterally from said path, said driven ram having track surfaces extending laterally of said path, each said rollable wedge having two spaced first disk members, two spaced second disk members, a central disk means, an axle, said second disk members mounted in spaced relationship on said axle between said first disks, said central disk means mounted on said axle between said second disk members, only one selected set of disk members of each said rollable wedge riding on said track surfaces of the driven ram, another selected set of disk members of each said rollable wedge riding said guide means, and the tapered driving ram contacting said central disk means of each rollable wedge and tending to wedge between the rollable wedges.

2. Ram construction comprising, a driven ram mounted for longitudinal reciprocable movement in a portion of a given path, power actuated tapered driving ram means aligned with said driven ram and mounted for longitudinal movement in a portion of said given path, separable rollable wedges, guide means extending in the general direction of said given path and having a predetermined profile defining retaining means diverging from said given path for confining said rollable wedges to predetermined separation paths diverging laterally from said path, said driven ram having bearing surfaces extending laterally of said path, each said rollable wedge having a compound structure of freely rotatable members mounted upon a common axle, only one selected set of rotatable members of each said rollable wedge riding on said bearing surfaces of the driven ram, another selected set of rotatable members of each said rollable wedge riding said guide means, and the tapered driving ram contacting another selected set of rotatable members of each rollable wedge and tending to wedge between the rollable wedges, whereby the relative speeds and power ratio between the driving and driven ram member is controlled by the profile of the guide means for the rollable wedges.

3. A portable hand compression tool comprising, a driven ram mounted for longitudinal reciprocable movement in a portion of a given path, work means associated with said driven ram, power actuated driving ram means aligned with said driven ram and mounted for longitudinal movement in a portion of said given path, separable rollable units, guide track means confining said members to predetermined separation paths, said guide track means defining a path which may present separation over a portion thereof but providing a path permitting divergence of the rollable members when considered in the entirety thereof and which divergence extends over an appreciable distance as opposed to one abrupt ending of the confining track to permit sudden lateral movement of the rollable units, said driven ram having track surfaces extending laterally of said path, each said rollable unit riding on said track surfaces of the driven ram and against said guide track means, the driving ram having driving interconnection with said rollable members providing both a longitudinal and lateral component of driving force.

4. Ram construction comprising, a driven ram mounted for longitudinal reciprocable movement in a portion of a given path, power actuated driving ram means aligned with said driven ram and mounted for longitudinal movement in a portion of said given path, separable rollable wedges, guide means extending in the general direction of said given path and having a predetermined profile defining retaining means diverging from said given path for confining said rollable wedges to predetermined separation paths diverging laterally from said path, said driven ram having bearing surfaces extending laterally of said path, each said rollable wedge having a compound structure of freely rotatable members mounted upon a common axle, only one selected set of rotatable members of each said rollable wedge riding on said bearing surfaces of the driven ram, another selected set of rotatable members of each said rollable wedge riding said guide means, and the driving ram imparting driving force to said wedge by engaging the wedge elsewhere than the said rotatable members which engage the guide means and bearing surfaces, whereby the relative speeds and power ratio between the driving and driven ram member is controlled by the profile of the guide means for the rollable wedges.

5. Ram construction comprising, a driven ram mounted for longitudinal movement in a given path, a driving ram mounted for longitudinal movement in the same general path, a rollable assembly interposed between said driven and driving rams for transmitting variable longitudinal movement from said driving ram to said driven ram, said rollable assembly comprising carrier means and first, second and third rollable wedges carried by said carrier means, said carrier means having connection means to connect said rollable wedges together as a unit, guide track means disposed laterally of said rollable assembly and having retaining profile means against which said first rollable wedge engages, said profile means having a longitudinally extending track portion to guide said first rollable wedge in the same general direction as said given path and having a laterally extending track portion divergingly outwardly from said given path to permit said first rollable wedge to move outwardly in a direction lateral to said given path, said driven ram having a bearing surface extending laterally of said given path against which the second rollable wedge engages for transmitting variable longitudinal movement to said driven ram, said bearing surface guiding said second rollable wedge to rollably move in a direction lateral to said given path, said driving ram having a pressure surface inclined to said given path for engaging the third rollable wedge, means for forcing the pressure surface of said driving ram against said third rollable wedge which in turn through said connection means of the carrier means forces said first rollable wedge in a lateral direction against said guide track means to thereby force said second rollable wedge against said bearing surface to transmit variable longitudinal movement from the driving ram to the driven ram, whereby relative speed and force between the driving and driven ram are controlled by the retaining profile means of said guide track means.

6. Ram construction comprising, a driven ram mounted for longitudinal movement in a given path, a driving ram mounted for longitudinal movement in the same general path, a rollable assembly interposed between said driven and driving rams for transmitting variable longitudinal movement from said driving ram to said driven ram, said rollable assembly comprising carrier means and two rollable wedges carried by said carrier means, said carrier means having connection means to connect said rollable wedges together as a unit, means for connecting said carrier means to said driven ram for transmitting variable longitudinal movement to said driven ram from said rollable assembly, guide track means disposed laterally of said rollable assembly and having retaining profile means against which one of said rollable wedges engages, said profile means having a longitudinally extending track portion to guide said one of said rollable wedges in the same general direction as said given path and having a laterally extending track portion divergingly outwardly from said given path to permit said one of said rollable wedges to move outwardly in a direction lateral to said given path, said driving ram having a pressure surface inclined to said given path for engaging the other of said rollable wedges, means for forcing the pressure surface of said driving ram against said other of said rollable wedges which in turn through said connection means of the carrier means forces said one of said rollable wedges in a lateral direction against said guide track means to thereby longitudinally move said carrier means toward said driven ram for transmitting variable longitudinal movement from the driving ram through said rollable assembly to the driven ram, whereby relative speed and force between the driving and driven ram are controlled by the retaining profile means of said guide track means.

References Cited in the file of this patent

UNITED STATES PATENTS

| | | |
|---|---|---|
| 378,978 | Ryan | Mar. 6, 1888 |
| 860,174 | Whitney | July 16, 1907 |
| 1,218,771 | Hoeschen | Mar. 13, 1917 |
| 1,720,133 | Le Roy | July 9, 1929 |
| 2,319,231 | Hawley | May 18, 1943 |
| 2,396,562 | Forss | Mar. 12, 1946 |
| 2,496,344 | Hall | Feb. 7, 1950 |